(12) United States Patent
Craft (10) Patent No.: US 8,140,824 B2
(45) Date of Patent: *Mar. 20, 2012

(54) SECURE CODE AUTHENTICATION (75) Inventor: David J. Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

This patent is subject to a terminal disclaimer.

(21) Appl. No.: 11/686,765

(22) Filed: Mar. 15, 2007

(65) Prior Publication Data

US 2008/0229055 A1    Sep. 18, 2008

Related U.S. Application Data (63) Continuation-in-part of application No. 10/302,447, filed on Nov. 21, 2002, now Pat. No. 7,194,626.

(51) Int. Cl.
H04L 9/00  (2006.01)

(52) U.S. Cl. ............. 711/217; 713/168; 713/176; 713/2

(58) Field of Classification Search .................. 711/216; 713/150–194
See application file for complete search history.

(56) References Cited

U.S. PATENT DOCUMENTS

| 4,713,753 | A | | 12/1987 | Boebert et al. |
| 5,018,096 | A | | 5/1991 | Aoyama |
| 5,355,413 | A | | 10/1994 | Ohno |
| 5,623,545 | A | * | 4/1997 | Childs et al. ................ 380/2 |
| 5,648,648 | A | | 7/1997 | Chou et al. |
| 5,692,199 | A | | 11/1997 | Kikinis et al. |
| 5,724,423 | A | | 3/1998 | Khello |
| 5,805,880 | A | | 9/1998 | Pearce et al. |
| 5,963,142 | A | | 10/1999 | Zinsky et al. |
| 5,987,133 | A | | 11/1999 | Aisaka |
| 6,009,520 | A | | 12/1999 | Gharda |
| 6,138,236 | A | | 10/2000 | Mirov et al. |

(Continued)

FOREIGN PATENT DOCUMENTS

WO    WO 01/57657 A1    8/2001

OTHER PUBLICATIONS

"Secure Remote Configuration for Networked Computer Systems"; IBM Technical Disclosure Bulletin; Jan. 1998; vol. 41, No. 01; pp. 653-655.

(Continued)

Primary Examiner — Brian Peugh
Assistant Examiner — Nicholas Simonetti
(74) Attorney, Agent, or Firm — Stephen R. Tkacs; Stephen J. Walder, Jr.; Matthew B. Talpis (57) ABSTRACT A computer program product comprises a computer useable medium having a computer readable program for authentication of code, such as boot code. A memory addressing engine is employable to select a portion of a memory, as a function of a step value, as a first input hash value. The step value allows for the non-commutative cumulative hashing of a plurality of memory portions with a second input hash value, such as a previous hash value that has been rotated left. An authenticator circuit is employable to perform a hash upon the portion of memory and the second input hash value. A comparison circuit is then employable to compare an output of the authenticator circuit to an expected value.

9 Claims, 6 Drawing Sheets

U.S. PATENT DOCUMENTS

| | | | |
|---|---|---|---|
| 6,141,752 A | 10/2000 | Dancs et al. | |
| 6,145,085 A | 11/2000 | Tran et al. | |
| 6,160,903 A | 12/2000 | Hamid et al. | |
| 6,185,678 B1 | 2/2001 | Arbaugh et al. | |
| 6,226,742 B1 | 5/2001 | Jakubowski et al. | |
| 6,263,431 B1 | 7/2001 | Lovelace et al. | |
| 6,327,652 B1 | 12/2001 | England et al. | |
| 6,823,463 B1 | 11/2004 | Challener et al. | |
| 6,892,305 B1 | 5/2005 | Dayan et al. | |
| 6,918,036 B1 | 7/2005 | Drews | |
| 6,959,384 B1 * | 10/2005 | Serret-Avila | 713/176 |
| 7,117,364 B1 | 10/2006 | Hepper et al. | |
| 2001/0013098 A1 | 8/2001 | Angelo et al. | |
| 2002/0161806 A1 * | 10/2002 | Shaikh | 708/300 |
| 2002/0184224 A1 * | 12/2002 | Haff et al. | 707/10 |
| 2003/0014668 A1 * | 1/2003 | Faccin et al. | 713/201 |
| 2003/0056107 A1 * | 3/2003 | Cammack et al. | 713/189 |
| 2003/0074548 A1 | 4/2003 | Cromer et al. | |
| 2003/0079132 A1 | 4/2003 | Bryant | |
| 2003/0200454 A1 | 10/2003 | Foster et al. | |
| 2003/0229777 A1 | 12/2003 | Morais et al. | |
| 2004/0103291 A1 * | 5/2004 | Craft | 713/193 |
| 2004/0230818 A1 | 11/2004 | Craft | |
| 2005/0138270 A1 | 6/2005 | Morais et al. | |

OTHER PUBLICATIONS

Guendouz et al., "Rapid Prototype of a Fast Data Encryption Standard With Integrity Processing for Cryptographic Applications", IEEE (ISBN 0-07803-4455-3); May-Jun. 1998, vol. 6, pp. 434-437.

Schneir, B., "Protocols, Algorithms, and Source Code in C", Applied Cryptography, Second Edition; John Wiley & Sons, Inc.; 1996; pp. 3-31, 38-40, 76, 107, 165-166, 351-355, 428-459.

U.S. Appl. No. 10/302,447.

U.S. Appl. No. 10/439,041.

\* cited by examiner

SECURE CODE AUTHENTICATION

This application is a continuation-in-part of application Ser. No. 10/302,447, filed Nov. 21, 2002, which issued as U.S. Pat. No. 7,194,626 on Mar. 20, 2007.

BACKGROUND

1. Technical Field

The invention relates generally to a boot control mechanism and, more particularly, to a boot control mechanism employing hardware signatures.

2. Description of Related Art

Security in a computer system is a concern. Unauthorized reading of code or data can occur in a computer system, or code or data can be inadvertently or maliciously changed within the computer system.

A conventional solution to security on boot code procedures is the employment of a software cryptographic lock, also known as a software cryptographic signature. Generally, the software cryptographic lock or cryptographic signature analyzes a piece of boot code by performing a function, such as a hash function, upon the suspect boot code. If the value calculated by the hash function is correct (that is, the software "signature" is correct), the suspect code is deemed to be secure and is allowed access to the system.

However, there are a variety of disadvantages associated with software hash systems. For instance, the computational complexity for hashing a block of 512 bits can be significant. Using a 32-bit RISC computer, for example, several thousand instructions can typically be used to process a 512 bit block of input data. Consequently, hash systems also generally provide slower validation processes. Therefore, a need exists for a hashing process that overcomes at least some of the deficiencies of conventional systems.

SUMMARY

In accordance with an illustrative embodiment, a computer program product comprises a computer useable medium having a computer readable program for authentication of a computer code sequence. The computer readable program, when executed on a computing device, causes the computing device to read a step value and an expected value, read an initial seed value to a first hash input, read a selected memory portion from a computer code sequence in memory to a second hash input according to the step value, and hash the first hash input and the second hash input. The computer readable program further causes the computing device to feed back the hash result into the first hash input for a next iteration and repeat the steps of reading a selected memory portion to the second hash input according to the step value, hashing the first hash input and the second hash input to produce a hash result, and feeding back the hash result into the first hash input for a next iteration until all memory portions have been hashed. Responsive to all memory portions being hashed, the computer readable program further causes the computing device to compare a last result of the hash with the expected value and if the result of the hash of the last sub-portion and the last feedback hash value is equal to the expected value, initiate execution of the computer code sequence on the computing device.

BRIEF DESCRIPTION OF THE DRAWINGS

For a more complete understanding of the present invention, and the advantages thereof, reference is now made to the following Detailed Description, taken in conjunction with the accompanying drawings, in which.

DETAILED DESCRIPTION OF THE ILLUSTRATIVE EMBODIMENTS

In the following discussion, numerous specific details are set forth to provide a thorough understanding of the present invention. However, those skilled in the art will appreciate that the present invention may be practiced without such specific details. In other instances, well known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or a microprocessor executing firmware, or some combination thereof. In one embodiment, dedicated integrated logic circuits that are encoded to perform such functions are used. In other embodiments, functions are performed by a processor, such as a computer or an electronic data processor, in accordance with code, such as computer program code, software, and/or integrated circuits that are coded to perform such functions, unless indicated otherwise.

Figure 1:
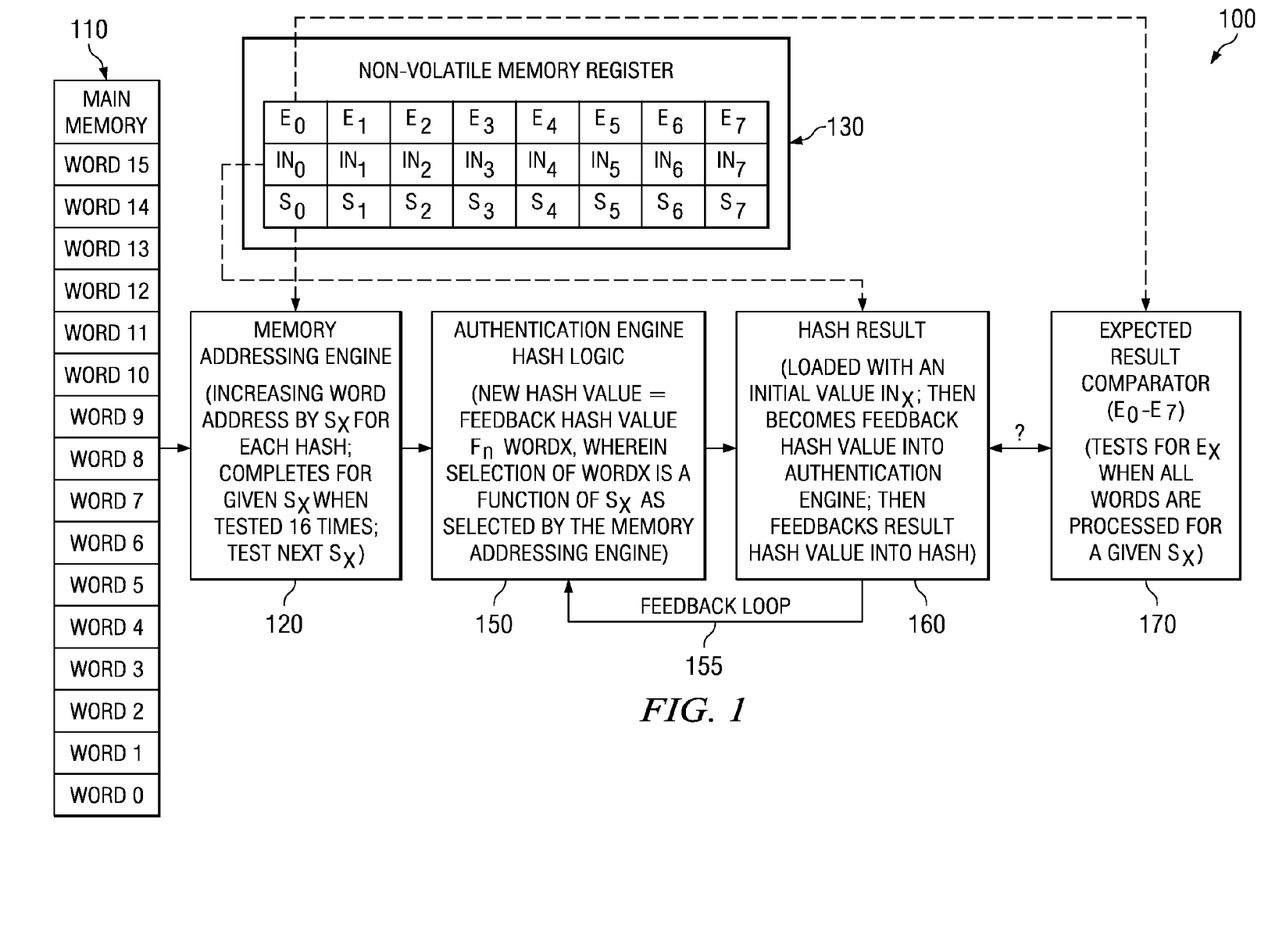
FIG. 1 schematically illustrates a hash system for validating boot code.

Turning now to FIG. 1, disclosed is a hash system 100. The hash system 100 comprises a main memory 110. The main memory 110 is divided into 16 memory words, memory word 0 to memory word 15. In the illustrated embodiment, the main memory is 512 bits, and each memory word is 32 bits, although those of skill in the art will understand that other main memory 110 sizes are within the scope of the present invention.

The hash system 100 comprises a non-volatile memory register 130. The memory register 130 comprises initialization values $IN_X$ ($IN_0$ through $IN_7$), a prime factor control, or "skip" value, $S_x$ ($S_0$ through $S_7$), and expected values $E_x$ ($E_0$ through $E_7$). These values are stored within the non-volatile memory 130 even when no power is applied to the system 100, thereby circumventing attempts of an authorized individual from changing these values and altering the hash function output.

Generally, the $IN_x$ value is a seed value that is input into an authentication engine 150. The $IN_x$ value is combined with word 0 in a hash function within the authentication engine 150. The hash logic 150 then performs a hash upon the two inputs. As is understood by those of skill in the art, a hash can be generally defined as non-commutative, cumulative combinatorial mathematical functions performed upon input, thereby creating a hardware boot code signature ("signature"). A good cumulative combinatorial function would be one in which all bits of the result from the previous iteration of the function are combined with all the bits of the input to produce a new result. Furthermore, all bits of the result should depend in some manner on the input and previous result values. A non-commutative function is one which performs operations in such a manner that the result of two successive iterations also depends on the order in which it processes the two input values. For example, the ADD function is commutative because (A+B) is the same as (B+A), but the SUBTRACT function is non-commutative, because (A−B) is not the same as (B−A) (unless A and B have identical values).

In the illustrated embodiment of FIG. 1, a hash of the memory words is performed by the authenticator 150. A hash result 160 comprises a function of the initial seed value and word 0. This creates a hash output, which is output into hash result 160. This output is then fed back to the input of the hash function through feedback loop 155. Substantially simultaneously, a second memory word is also fed into the input of the hash of the authentication engine 150, thereby creating a new hash result.

An $S_x$ value is then input from the non-volatile memory register 130 into the memory addressing engine 120. Generally, the memory addressing engine 120 selects words from the main memory 110 as a function of the $S_x$ value. The selected word is then input into a hash function 150, one per hash. Each selection of a new word by the memory addressing engine 120 occurs when a new hash is performed by the authentication engine 150. For instance, if $S_x=1$, the memory words would be selected by the memory addressing engine 120 in the order of memory word 0, memory word 1, memory word 2, and so on, one per hash performed by the authentication engine 150. If $S_x=3$, the memory words selected would be memory word 0, memory word 3, memory word 6, and so on, one per hash performed by the authentication engine 150. In one embodiment, the first word loaded is defined to be word 0.

In one embodiment, the skip value is a prime number relative to the number of memory ranges to be tested. For instance, in FIG. 1, there are 16 memory words to be tested. Sixteen equals $2^4$. Therefore, any number between one and sixteen that is not a factor of 2 is an acceptable prime number and can be used for $S_x$. The order of selection of the memory words is performed by the memory addressing engine 120 by starting from a specified memory address, such as the address "0." Then, the $S_x$ value is added to determine the next acceptable address.

| Prime | Order of Combination of Memory Words 0–15 |
| --- | --- |
| $S_x = 1$ | 0, 1, 2, 3, 4, 5, 6, 7, 8, 9, 10, 11, 12, 13, 14, 15 |
| $S_x = 3$ | 0, 3, 6, 9, 12, 15, 2, 5, 8, 11, 14, 1, 4, 7, 10, 13 |
| $S_x = 5$ | 0, 5, 10, 15, 4, 9, 14, 3, 8, 13, 2, 7, 12, 1, 6, 11 |
| $S_x = 7$ | 0, 7, 14, 5, 12, 3, 10, 1, 8, 15, 6, 13, 4, 11, 2, 9 |
| $S_x = 11$ | 0, 11, 6, 1, 12, 7, 2, 13, 8, 3, 14, 9, 4, 15, 10, 5 |
| $S_x = 13$ | 0, 13, 10, 7, 4, 1, 14, 11, 8, 5, 2, 15, 12, 9, 6, 3 |
| $S_x = 15$ | 0, 15, 14, 13, 12, 11, 10, 9, 8, 7, 6, 5, 4, 3, 2, 1 |

In other words, the hash circuit 150 employs the word selected by the memory addressing engine 120 as a function of the skip value $S_x$ in a cumulative, non-commutative hashing. The result of each non-commutative combination hashing is then fed back into the hash circuit, to be combined with the next word selected by the memory addressing engine 120 in a non-commutative cumulative fashion.

For instance, if $S_x=3$, first memory word 0 would be fed into the hash function from the memory addressing engine 120, along with the seed value $IN_x$. Then, the output of the hash performed by the authentication engine 150 is fed back into the hash of the authentication engine 150 through feedback loop 155. The memory addressing engine then outputs to the authentication engine another word, 3. These are both hashed together again in the authentication engine 150. The output of this new hash is fed as further input into the hash of the authentication engine 150 through feedback loop 155, along with the word 6 selected by the memory addressing engine, and so on. This process of hashing continues until all memory ranges have been tested.

In the illustrated embodiment, the hash circuit 150 employs the skip value $S_x$ until all locations in the main memory 110 are read and non-commutatively combined. In the illustrated embodiment, $S_x$ is prime, or is composed of prime factors which do not include those forming the size of the main memory 110. Therefore, each memory word of memory 110 is selected once for a given $S_x$ if the value of $S_x$ is employed by the memory addressing engine 120 a number of times equal to the number of words in the main memory 110. For example, if $S_x$ equals 3, and there are 16 words in memory, when the memory addressing engine 120 has selected and transmitted words 0, 3, 6, 9 and so on, 16 times, all words in the memory 110 have been selected by the memory addressing engine 120 and transmitted to the authentication engine 150 for hash processing.

In the illustrated embodiment, once the address generated by the memory addressing engine 120 is higher than the maximum address of main memory, the address "wraps around." For instance, if the $S_x$ value is "3," and the last word selected by the memory addressing engine 120 is word 15, the next word to be selected is word 2, word 5, and so on. In one embodiment, the selection of words by the memory addressing engine continues until the number of selections equals the number of words in the main memory 110.

Once all main memory locations have been tested in combination with a given $IN_x$, a final hashed value ($FV_x$) for the given $IN_x$ is then input into the hash result register 160. The hash result register 160 compares the $FV_x$ to the expected value $E_x$ received from the non-volatile memory register 130. If the two are equal, then the words in the main memory 110 have successfully passed the test associated with that particular $IN_x$ value. The system 100 then starts testing the next $IN_x$ value, and the memory addressing engine 120 employs the next associated $S_x$ value for the next round of memory word selection. If there are no more $IN_x$ values to hash, then the memory information, such as boot code has passed the hashing logic and is, therefore, "secure", that is, unaltered, and the test ends. However, if for any value $IN_x$ the $FV_x$ is not equal to the $E_x$, the words in main memory 110 have not successfully passed the test associated with the $IN_x$ value, the code is deemed "altered," the code is unacceptable, and the test ends.

In the illustrated embodiment, increasing the number of $S_x$ values employed for generating $FV_x$s compared to the $E_x$s typically decreases the odds of altered code being mistakenly deemed unaltered when the hash result is compared to the $E_x$. For instance, although altered code could pass a first pass of the memory for a given $S_x$, thereby creating a $FV_1$ that was correct, employing a new value of $S_x$ by the memory addressing engine 120 and performing a second pass through the memory 110 in a different order for employment by the authentication engine 150 typically generates a different $FV_x$. The probability of adulterated code passing all comparisons between $FX_x$s and $IN_x$s decreases with each additional $FV_x$ that is calculated.

In the illustrated embodiment of FIG. 1, the authentication engine 150 employs a cumulative, but non-commutative, process to combine the series of words and hash results to construct hash, or signature, values for comparison with the expected value $E_x$, one per $IN_x$. As will be understood by those of skill in the art, non-commutative implies the hash result, generated by the hash circuit 150, and depends upon the order in which input values are processed by the hash circuit 150, as well as the input values themselves.

For example, generally, if a functions $f_c$ used to combine various values is commutative, then (A $f_c$ B) yields the same result as (B $f_c$ A). However, in the illustrated embodiment, the selected word by the memory addressing engine 120 and the hash result 160 are to be combined in the non-commutative cumulative hash circuit 150, as the function employed by the circuit 150 is non-commutative. Therefore, (A $f_n$ B) and (B $f_n$ A) generally yield different results.

In one embodiment, the authentication engine 150 employs a rotate left 1 bit ("rot1") functionality. Generally, rot1 takes data, such as a memory range or a seed value, stores then erases the most significant digit, moves each digit to the next highest significant placeholder, and places the stored most significant digit into the least significant digit placeholder. In one embodiment, a rotate right function is employed. Also, other functions can be employed to make the logic combinations non-commutative.

In the illustrated embodiment, the authentication engine 150 employs combinations of at least two values, at least one of which has been altered to make the combination a generally non-commutative cumulative function.

New hash value=(Old hash feedback output fn word$_x$).

In other words, the old hash feedback output is combined in a non-commutative combinatorial manner with a sequence of words selected by the memory addressing engine 120 from main memory, the address used being incremented each time by the $S_x$ value. For the memory word 0, the hash seed value $IN_x$ is substituted for the old hash output.

In FIG. 1, a non-commutative cumulative function $f_n$ comprises employment of a "rot1" functionality. In one embodiment, the values are combined using a logical AND function.

New hash value=(_rot1,(R, 1)+word$_x$)

In other words, rotate left the old hash value by 1, which was the feedback hash value from the hash result 150, and then add the word$_x$ selected by the memory addressing engine 120, to get the hash result. In another embodiment, the values are combined using a logical XOR function. Generally, employment of the non-commutative cumulative function, such as rot1 functionality, within the authentication engine 150, decreases the odds of adulterated code deemed unadulterated when the system 100 compares the $FV_x$ to $E_x$.

Figure 2A:
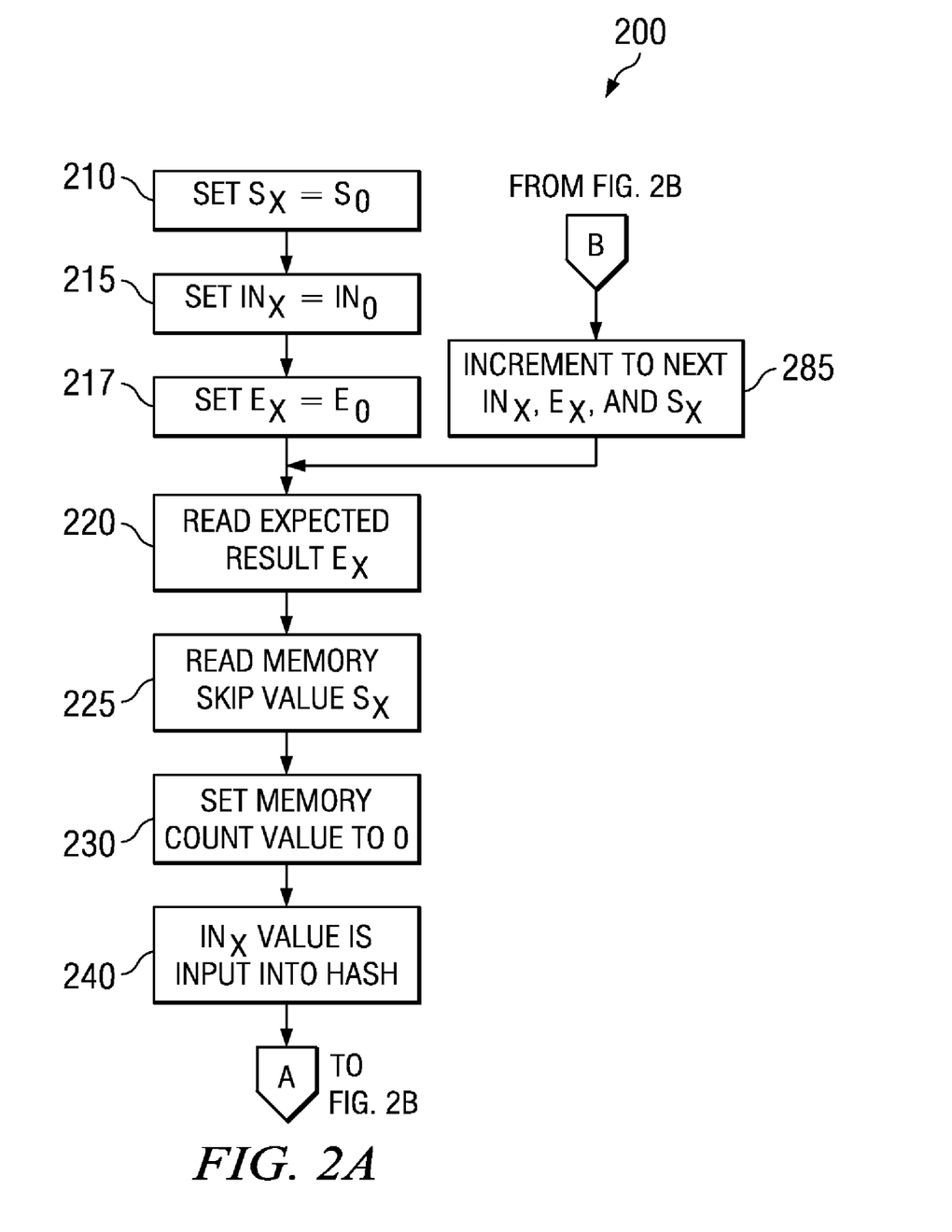
FIGS. 2A and 2B illustrate a method diagram for employing the hash system.
Figure 2B:
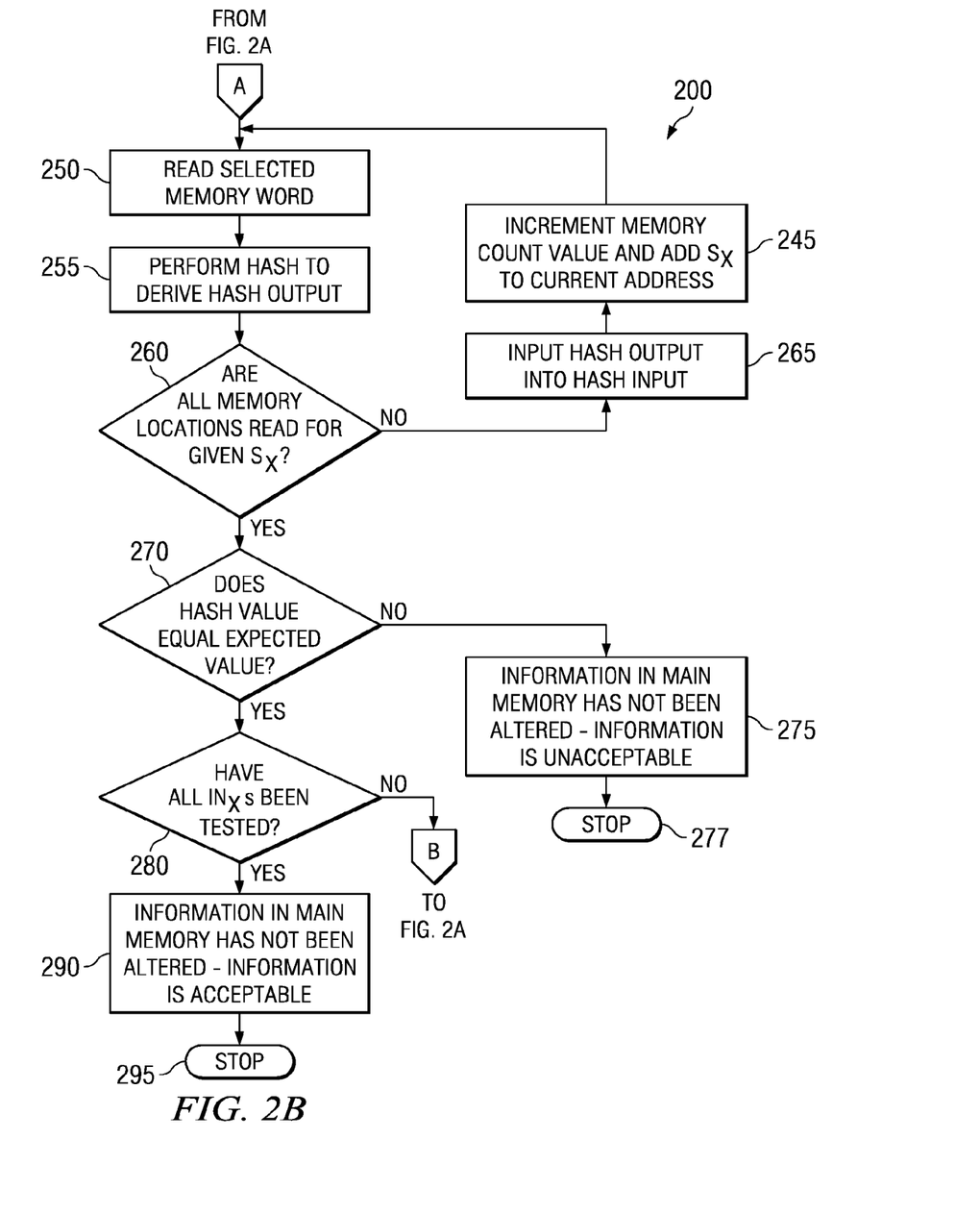

Turning now to FIGS. 2A and 2B, illustrated is a method 200 for authenticating code. Generally, in the method 200, the authentication engine 150 hashes input values to create a series of $FV_x$. These $FV_x$s are compared to the expected value $E_x$ to determine whether the words of the main memory 110 contain unaltered code and/or data, or whether the code and/or data has been altered, and is, therefore, unacceptable.

In step 210, the memory addressing engine 120 defines $S_x$ as $S_0$ In step 215, $IN_x$ is defined as $IN_0$. In step 217, $E_x$ is defined to be $E_0$.

In step 220, the expected value $E_x$ is read from the non-volatile memory register 130 by the expected result comparator 170. In step 225, the step value $S_x$ is read from the non-volatile memory register 130 by the memory addressing engine 120. Typically, the value $S_x$ is a prime number or a combination of prime numbers in relation to the memory to be authenticated, such as main memory 110. In method 200, for ease of illustration, $S_0=1$, although other values for $S_0$ are within the scope of the present invention.

In step 230, a memory count value is set equal to zero. The memory count value can be generally defined as how many times the value $S_x$ has been added to the starting value. In one embodiment, the starting value is zero, corresponding to word zero.

In step 240, the $IN_x$ value is input from the non-volatile memory register 130 into the hash result 160, which is fed into the authentication engine 150 through feedback loop 155. In a further embodiment, $IN_x$ is input directly into the authentication engine 150.

In step 250, a selected word from main memory 110, correlating to $S_x$ multiplied by the memory count value, is transmitted from the memory addressing engine 120 to the authentication engine 150. If the memory count value is a higher number than the number of words in memory, a memory wrap around occurs.

In step 255, the selected word from main memory 110 is hashed with either the seed value $IN_x$ or the previous hash result. This hashing can comprise such hashing as is disclosed in equation (1).

In step 260, the memory addressing engine 120 determines if all memory locations or portions, such as words, for a given $S_x$ have been read. In one embodiment, this is performed through comparing the memory count value to the number of words in main memory 110. If all words in main memory 110 have not been selected, then step 265 is executed. In step 265, the output of the hash circuit 150 is fed back into the input of the hash circuit through employment of the feedback loop 155, as illustrated in equation (1). Then, in step 245, the memory location count value is incremented by "1," and the next memory word address is formed by adding the $S_x$ value to the current address, wrapping around if necessary. Steps 250 and 255 re-execute, and this loop continues until all words have been read for a given $S_x$.

However, if all memory locations have been read for a given $S_x$, then step 270 determines whether the final value $FV_x$ of the hash circuit 150 is equal to the expected value $E_x$ that is stored in the non-volatile memory register 130. In step 275, if they are not equal, the code and data in main memory 110 has been altered and is, therefore, unreliable and has failed validation. The method then stops at step 277.

However, if the final hash value for the given $S_x$ does equal the expected value $E_x$, then the words in main memory 110 have passed authentication for that combination of the values of $S_x$ and $IN_x$. Then in step 280, the method 200 determines whether all $IN_x$ values have been tested. If they have, then the words in the main memory 110 have passed the validation, and have not been altered in step 290. Therefore, the method ends at step 295.

However, if all $IN_x$s have not been tested, in step 285, the selected $IN_x$ is then incremented from $IN_x$ to $IN_{(x+1)}$, such as $IN_3$ to $IN_4$. Furthermore, the corresponding $S_x$ is also incremented to $S_{(x+1)}$, such as from $S_3$ to $S_4$. $E_x$ would be incremented to $E_{(x+1)}$, such as from $E_3$ to $E_4$. Then, the method 200 executes again until either all $IN_x$s have been tested and pass the test, or until a final hash value $FHV_x$ does not equal its corresponding $E_x$.

Figure 3:
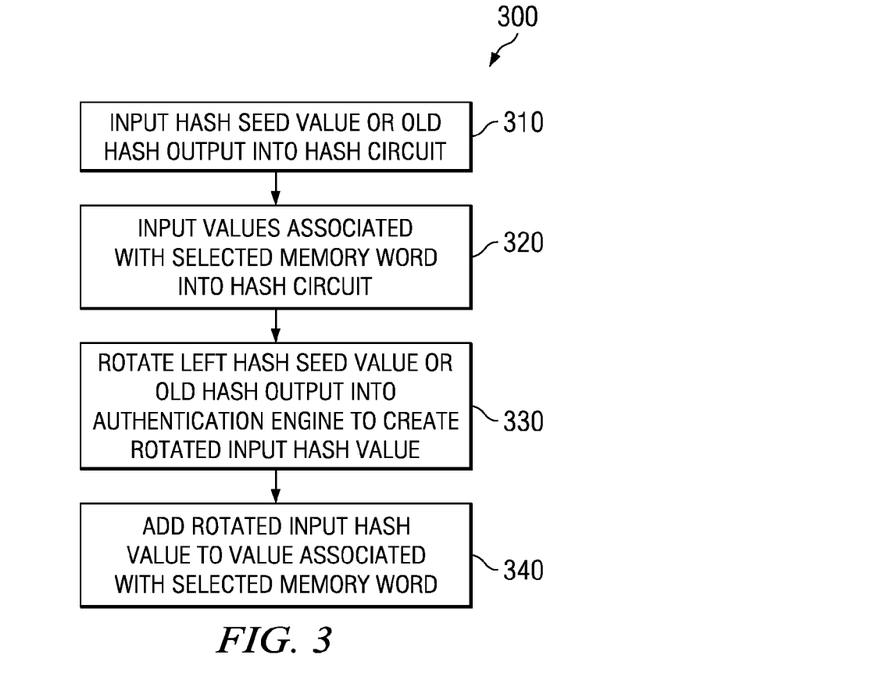
FIG. 3 illustrates a method diagram for employing the hash logic hardware.

Turning to FIG. 3, disclosed is a method diagram 300 for generating a hash value, such as is performed in step 255 of method 200. In step 310, the hash circuit inputs the $IN_x$, or the previous hash output from a previous invocation of the step 255. In step 320, the word selected by the memory addressing engine 120 is also input into the hash. In step 330, either the word or the previous value is rotated left to create a rotated input hash value. Finally, in step 340, the rotated input hash value is added to the non-rotated hash value to get hash result. In one embodiment, the previous hash value is the value that is rotated left.

Figure 4:
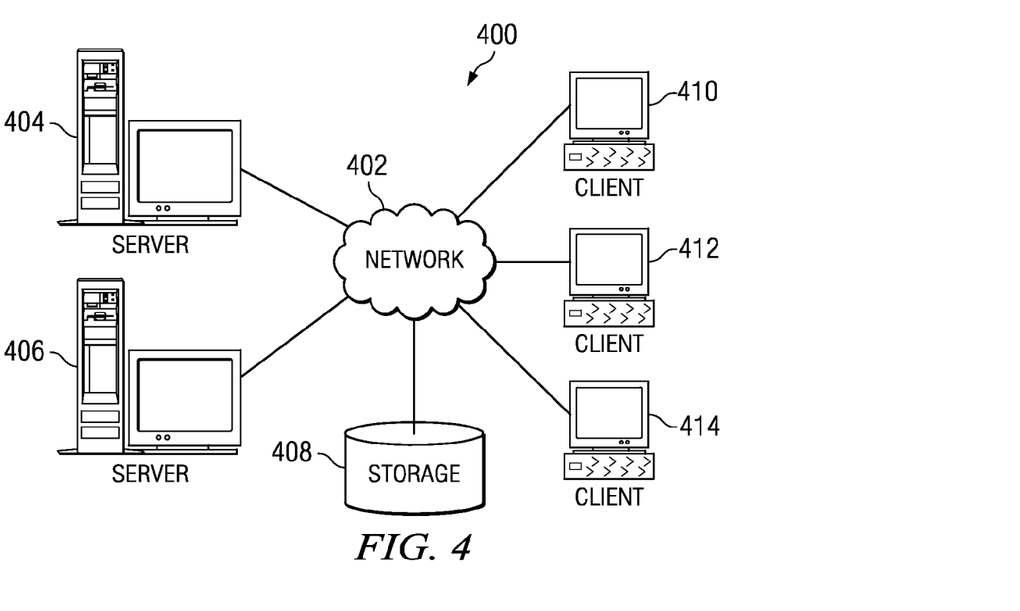
FIG. 4 depicts a pictorial representation of an exemplary distributed data processing system in which aspects of the illustrative embodiments may be implemented.
Figure 5:
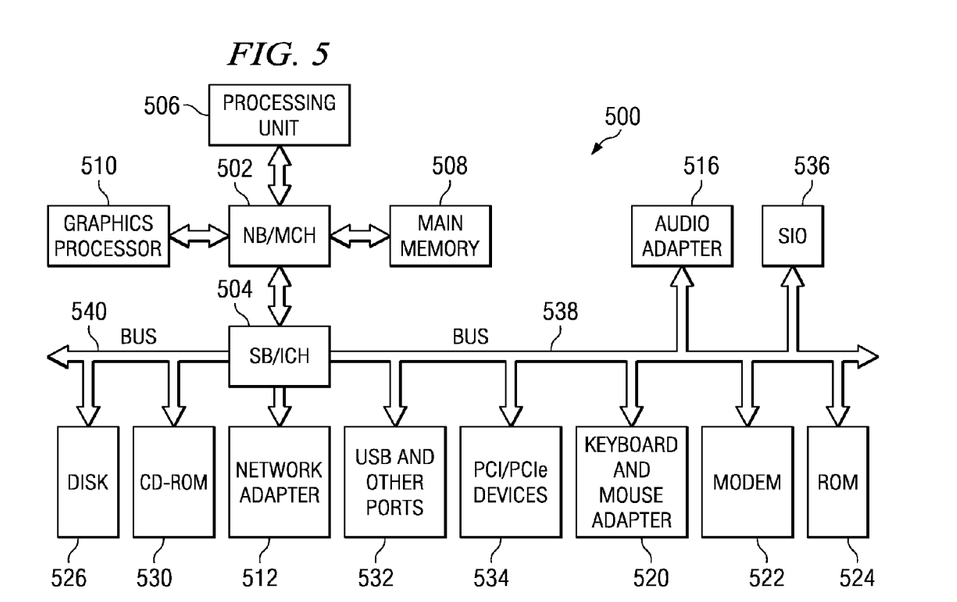
FIG. 5 is a block diagram of an exemplary data processing system in which aspects of the illustrative embodiments may be implemented.

With reference now to FIGS. 4-5, exemplary diagrams of data processing environments are provided in which embodiments of the present invention may be implemented. It should be appreciated that FIGS. 4-5 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 4 depicts a pictorial representation of an exemplary distributed data processing system in which aspects of the illustrative embodiments may be implemented. Distributed data processing system 400 may include a network of computers in which embodiments of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, video game consoles, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

A video game console is a specialized desktop computer used to play video games. Game software is available on compact disks or digital video disks, although earlier game machines used cartridges containing read only memory (ROM) chips. Video game consoles often use a television or video monitor for display.

Video game consoles are typically powered by operating systems and processors that may differ from desktop computers. Video game consoles are considered "closed" systems, meaning they are under the control of their respective manufacturers, and the software is geared to the machine's capabilities. Games are not interchangeable with other game consoles or desktop computers, although software publishers may develop games for more than one platform. Handheld video games are miniature versions of video game consoles and are typically less elaborate. Handheld game consoles are entirely portable, self-contained, battery-operated devices with their own smaller screens.

Each video game console, or handheld game console, is designed to run software that is specifically licensed to run on that particular system. More importantly, each video game console boots up using controlled boot code that ensures the security of the system. For this reason, video game consoles are much less likely to be infected with a virus or other malicious software. However, the task of authenticating boot code, or any portion of software running on the system, is critical to the security of the system. Therefore, the authentication method and system described above are particularly useful for authenticating boot code and game software for a video game console, although they are certainly useful for any computer system, including servers, desktop computers, telephone devices, etc.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like.

Server 406 may provide software or firmware updates for clients 410, 412, 414. When one of clients 410-414 receives a software or firmware update from server 406, the client may install the update. However, before the client executes the updated software or firmware, it must authenticate the portion of code.

As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

With reference now to FIG. 5, a block diagram of an exemplary data processing system is shown in which aspects of the illustrative embodiments may be implemented. Data processing system 500 is an example of a computer, such as server 404 or client 410 in FIG. 4, in which computer usable code or instructions implementing the processes for illustrative embodiments of the present invention may be located.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash binary input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 500 (Java is a trademark of Sun Microsystems, Inc. in the United States, other countries, or both).

As a server, data processing system 500 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

Main memory 508, ROM 524, HDD 526, or CD-ROM drive 530, or alternatively a DVD-ROM drive (not shown), may store software code that may execute on data processing system 500. More particularly, ROM 524 may store firmware. Thus, data processing system 500 may implement aspects of the code authentication method and system described above to determine that the software or firmware code is secure before execution.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

Those of ordinary skill in the art will appreciate that the hardware in FIGS. 4-5 may vary depending on the implementation. Other internal hardware or peripheral devices, such as flash memory, equivalent non-volatile memory, or optical disk drives and the like, may be used in addition to or in place of the hardware depicted in FIGS. 4-5. Also, the processes of the illustrative embodiments may be applied to a multiprocessor data processing system, other than the SMP system mentioned previously, without departing from the spirit and scope of the present invention. The hardware-based secure code authentication mechanism described above may be embedded within processing unit 506 or may be a separate component (not shown), connected to bus 538, for example.

Alternatively, the secure code authentication may be implemented in software on a dedicated processor (not shown) or processing unit 506, for example.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device which is configured with flash memory to provide non-volatile memory for storing operating system files and/or user-generated data, for example. Essentially, data processing system 500 may be any known or later developed data processing system without architectural limitation.

Figure 6:
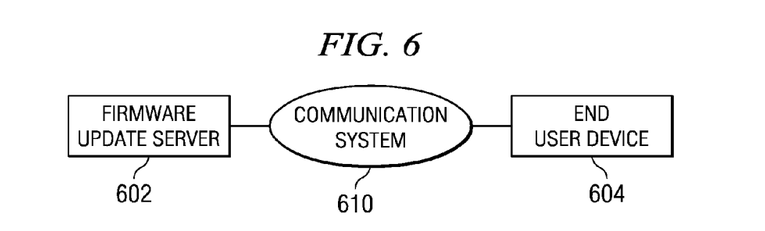
FIG. 6 is a block diagram illustrating a data processing system for performing a firmware update on an end user device in accordance with an illustrative embodiment.

FIG. 6 is a block diagram illustrating a data processing system for performing a firmware update on an end user device in accordance with an illustrative embodiment. Firmware update server 602 provides access to a firmware update through communication system 610. End user device 604 may receive the firmware update from firmware update server 602. End user device 604 may request the firmware update, or firmware update server 602 may push the firmware update to end user device 604. Before end user device 604 executes the updated firmware, it must authenticate the updated firmware. This updated firmware may include boot code; however, the updated firmware may contain the code needed to perform authentication of boot code or other software code.

Figure 7:
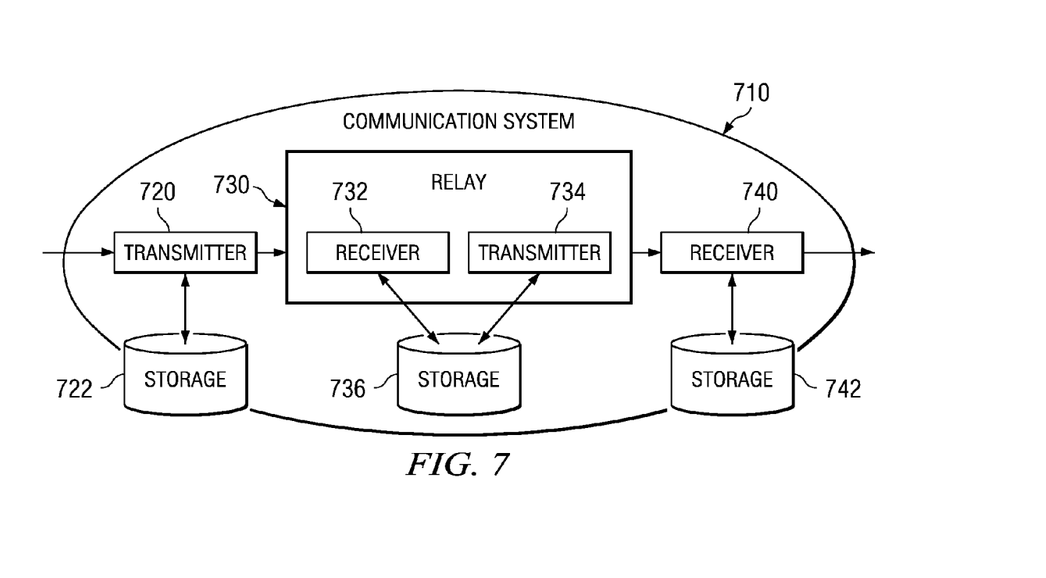
FIG. 7 is a diagram illustrating a communication system in accordance with an illustrative embodiment.

FIG. 7 is a diagram illustrating a communication system in accordance with an illustrative embodiment. Communication system 710 may propagate transmission of firmware updates or other software updates that include computer code for performing code authentication as described above with respect to the illustrative embodiments. Alternatively, communication system 710 may propagate transmission of firmware updates or other software updates that include contents of non-volatile memory register 130 in FIG. 1. Communication system 710 may be, for example, communication system 610 in FIG. 6.

In the depicted example, transmitter 720 may receive computer program code for performing code authentication from a firmware update server, for example. Transmitter 720 may be, for example, a modem, a network interface card, a wireless network card, a host adapter, or the like. Alternatively, transmitter 720 may be a switch, router, workgroup switch, wireless access point, or the like. Transmitter 720 may temporarily store the computer program code in storage 722. Transmitter 720 may transmit the computer program code to other entities in communication system 710, such as relays, routers, switches, and the like, through some medium. In this example, transmitter 720 transmit the computer program code to relay 730, which then transmits the computer program code to receiver 740.

Relay 730 comprises receiver 732 and transmitter 734. Receiver 732 may store the computer program code in storage 736 until transmitter 734 retrieves the computer program code and transmits the computer program code through some medium to receiver 740. Receiver 740 may be, for example, a modem, a network interface card, a wireless network card, a host adapter, or the like. Alternatively, receiver 740 may be a switch, router, workgroup switch, wireless access point, or the like. Receiver 740 may temporarily store the computer program code in storage 742 until it is accessed by an end user device, for example. Storage 722, 736, 742 may be, for example, volatile memory, such as a dynamic random access memory (DRAM). As such, storage 722, 736, 742 may be a buffer or other temporary storage used in transmitters, receivers, or relays.

Figure 8:
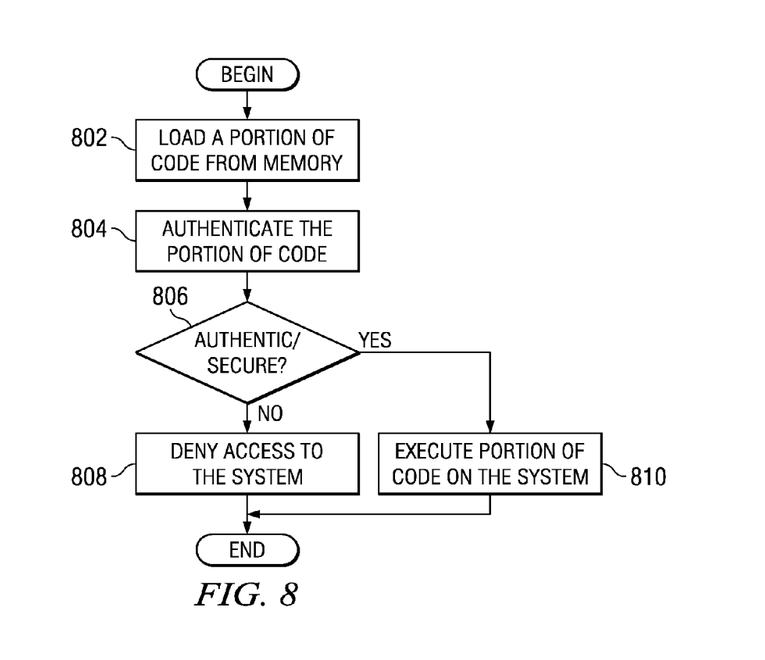
FIG. 8 is a flowchart illustrating operation of a computer system running secure software in accordance with an illustrative embodiment.

FIG. 8 is a flowchart illustrating operation of a computer system running secure software in accordance with an illustrative embodiment. The computer system may be a server, desktop computer, video game console, or the like. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Returning to FIG. 8, operation begins and the computer system loads a portion of code from memory or storage (block 802). The portion of code may be boot code or other portion of software code. Next, the computer system authenticates the portion of code (block 804). In accordance with an illustrative embodiment, the computer system authenticates the portion of code as shown in FIGS. 2A and 2B.

Thereafter, the computer system determines whether the portion of code is authentic or secure (block 806). If the portion of code fails authentication, then the computer system denies access to the system (block 808), and operation ends. If the portion of code passes authentication in block 806, the computer system initiates execution of the portion of code (block 810), and operation ends.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer program product comprising a computer storage medium having a computer readable program for authentication of a computer code sequence, wherein the computer readable program, when executed on a computing device, causes the computing device to:
    read a step value and an expected value;
    read an initial seed value to a first hash input;
    read a selected memory portion from a computer code sequence in memory to a second hash input according to the step value;
    hash the first hash input and the second hash input;
    feed back the hash result into the first hash input for a next iteration;
    repeat the steps of reading a selected memory portion to the second hash input according to the step value, hashing the first hash input and the second hash input to produce a hash result, and feeding back the hash result into the first hash input for a next iteration until all memory portions have been hashed;
    responsive to all memory portions being hashed, comparing a last result of the hash with the expected value; and
    if the result of the hash of the last sub-portion and the last feedback hash value is equal to the expected value, initiate execution of the computer code sequence on the computing device.

2. The computer program product of claim 1, wherein hashing the first hash input and the second hash input further comprises rotating left the most significant digit of the second hash input.

3. The computer program product of claim 1, wherein hashing the first hash input and the second hash input further comprises employing a non-commutative cumulative combination.

4. The computer program product of claim 1, wherein reading a selected memory portion to a second hash input according to the step value further comprises employing a memory wrap around for selecting a memory portion such that all memory portions are selectable according to the step value.

5. The computer program product of claim 1, wherein the computer readable program, when executed on a computing device, further causes the computing device to:
   repeat execution of the computer readable program for authentication of a computer code sequence using a plurality of initial seed values, a plurality of corresponding step values, and a plurality of corresponding expected values.

6. The computer program product of claim 1, wherein the computer code sequence is boot code.

7. The computer program product of claim 1, wherein the computer readable program, when executed on a computing device, further causes the computing device to:
   determine that the portion of code has been altered if the result of the hash of the last sub-portion and the last feedback hash value is not equal to the expected value.

8. The computer program product of claim 1, wherein reading the step value and the expected value and reading the initial seed value to a first hash input comprise reading the step value, expected value, and initial seed value from a non-volatile memory register.

9. The computer program product of claim 5, wherein the plurality of initial seed values, the plurality of corresponding step values and the plurality of corresponding expected values are read from a nonvolatile memory register.

* * * * *